Patented Aug. 24, 1954

2,687,408

UNITED STATES PATENT OFFICE 2,687,408

AQUEOUS POLYMERIZATION WITH A PHOSPHATE SUSPENDING AGENT AND A BUFFER

John Marshall Grim, Lancaster, Pa., assignor to Koppers Company, Inc., a corporation of Delaware No Drawing. Application October 3, 1951, Serial No. 249,633

12 Claims. (Cl. 260—93.5)

This invention relates to polymerization and is particularly directed to new and improved methods of producing bead-shaped polymeric materials.

Generally, bead-shaped polymeric materials, hereinafter referred to as "bead polymers," are formed in suspension polymerization, which is sometimes designated as pearl polymerization, bead polymerization or granular polymerization. In these processes, a polymerizable ethylenic monomer is dispersed or suspended in an immiscible liquid, such as water, in such a way that on completion of the process the polymer settles out as spherical particles or beads.

It is known that the formation of bead polymers of polymerizable ethylenic monomers may be accomplished with an aqueous suspension of the monomer in the presence of a dispersing agent which helps to keep the globules of monomer dispersed during the polymerization. Such difficultly soluble phosphates as the calcium, barium, and magnesium phosphates have been proposed as dispersing agents for this purpose because of their ability to function as suspension stabilizers or agglomeration inhibitors. Under very restrictive conditions or attendant disadvantages, these phosphate compounds tend to prevent or diminish the tendency of the globules of the dispersed polymerizing monomer or polymerization product to agglomerate or coalesce during the polymerization.

It is now known that these difficultly soluble phosphates are not completely satisfactory for this purpose, and generally the present practice of suspension polymerization with these dispersing agents is accompanied by a number of serious limitations. Firstly, an individual phosphate of this group may be unpredictable and erratic in its performance and efficiency in these polymerizations. In fact, the same chemical entity obtained from different manufacturers, and sometimes even from the same manufacturer, may be sharply contrasting in its utility for this purpose.

Secondly, the productive capacity of suspension polymerization equipment is restricted to a relatively low output because of the low monomer/water ratio which is required in order to obtain bead polymers of desired properties for molding. In producing polymers of sufficient molecular weight to give the desired properties, it is necessary under present practice to use a low monomer/water ratio to prevent the dispersed globules from coalescing completely during the period required to obtain the desired polymerization.

On the other hand, and thirdly, if it is desired to increase the output of the given equipment by increasing the monomer/water ratio, it is found that the critical, sticky or gummy phase of the polymerization process, which is claimed to occur somewhere between 20 and 70 per cent conversion of styrene to polymer, must be made relatively short in duration by the use of large amounts of catalyst. These large amounts of catalyst apparently speed the polymerization through the sticky phase before the globules have the opportunity to coalesce completely, but the resultant high polymerization rates produce polymers having molecular weights lower than desired in polymers to be used in the molding trade.

These disadvantages have been in a large measure overcome by the use of sub-micronic size phosphate particles with or without an "extender" as described and claimed in my presently copending application, Serial Number 786,655, now U. S. Patent 2,594,913, of which this application is a continuation-in-part.

In addition, it has been observed that the degree of conversion can be increased and the polymerization time cycle reduced by heating the polymerization suspension to a temperature in excess of approximately 100° C. However, difficultly soluble phosphates do not give uniform results as dispersing agents when the temperature is so raised and agglomeration or precipitation is often encountered.

The general purpose and object of the present invention is to circumvent, simply and effectively, the above-described limitations of suspension polymerization processes employing difficultly soluble phosphates as dispersing agents, or suspension stabilizers, so that existing or contemplated installations can be employed optionally to produce, as required, either high or low outputs of bead polymers having either high or low molecular weights. Another object is to provide for the stated purpose, polymerization suspensions which are substantially insensitive to irregularities in composition or in physical operating conditions, to provide improved control of bead size and provide processes in which reproducible results can be obtained consistently. The invention has for further objects such other improvements and such other operative advantages as may be found to result from the methods hereinafter described or claimed.

A particular object of this invention is to provide means for stabilizing polymerization suspensions utilizing difficultly soluble phosphates as dispersing agents over a wider and more varied scope of operating conditions than presently known in the art.

In my above-mentioned application there are disclosed and claimed dispersing agents of submicronic particle size, including for example, difficultly soluble phosphates prepared by precipitation methods, e. g., from ortho-phosphoric acid and an appropriate oxide or base, and in which the phosphates contain at least three equivalents of base for each phosphate group. It has been discovered that superior results are obtained when an amount of oxide or hydroxide of a metal chosen from the group consisting of magnesium, calcium, barium, and zinc in excess of that which will be included in the phosphate is utilized, particularly in stabilizing the polymerization suspensions at temperatures above 100° C. Further, such oxides or hydroxides may be used with a separately prepared phosphate or with commercial grade phosphate to give increased suspension stability. Apparently the magnesium, calcium, barium, and zinc oxides and hydroxides act as buffers and hereinafter they are referred to by that term.

The aforestated objects, and others, which will become apparent from the description, are accomplished in the present invention by using as a dispersing agent a "difficultly soluble" phosphate containing at least three equivalents of metal for each phosphate group, an extender, and in addition, a buffer which comprises an oxide or hydroxide of a metal chosen from the group consisting of magnesium, calcium, barium, and zinc. Magnesium oxide, when used in conjunction with magnesium phosphate, especially that prepared synthetically, has been observed to give excellent results. It is preferred that the metal in the buffer and in the phosphate be the same, but this is not essential. At the limiting operable monomer/water ratios for phosphate suspension agents without an extender, the use of small quantities of buffer gives increased stability. However, superior results are obtained utilizing an extender since its use increases the operable monomer/water ratio and this suspending means is preferred.

The buffers act to maintain the pH of the polymerization suspension approximately in the range 6 to 9 which range gives stability with a wide variety of dispersing agents and extenders. They are preferred to, and possess advantage over, conventional buffering agents in that they can be utilized in relatively small quantities and to not give erratic results which are observed with certain buffering agents, for example, sodium hydroxide. In general, these buffers are utilized in amounts of between approximately 2% and 15% by weight based on the amount of phosphate dispersing agent present. It will be realized that this range covers the amounts of various buffers which should be used to maintain the pH of the system between approximately 6 and 9. Individual buffers may have a range of less breadth, for example, magnesium oxide when used with magnesium phosphate has a preferred range of 2.5% to 5.0%, while calcium hydroxide when used with calcium phosphate gives excellent results at 12%. It is preferred to use a purified grade of buffer to minimize the introduction of impurities into the polymerization suspension.

"Difficultly soluble" phosphates are those phosphates which are not classifiable as water-soluble phosphates. The term "difficultly soluble" includes in its scope the terms "insoluble," "very slightly soluble" and "slightly soluble" given in Hackh's Chemical Dictionary, Third Edition, page 787, and is intended to mean that more than 100 parts by weight of water are required to dissolve one part by weight of phosphate. In all cases in the practice of this invention, there should be enough phosphate present to have undissolved phosphate particles in the suspension system. The base or metal component of those phosphates may be any metal whose carbonate is also difficultly soluble in water. Thus, the metal may be calcium, barium, strontium, magnesium, aluminum, zinc, cadmium, iron and like metals, all of which give difficultly soluble phosphates. The term "submicron" is used in the sense defined in Hackh's Chemical Dictionary, Third Edition, page 813, as meaning a particle between 0.2 and 0.005 micron in diameter.

Phosphates of the type and particle size described above as suitable for the practice of the invention may be prepared by precipitation methods. For example, metathetic or double decomposition reactions may be used to obtain precipitates of difficultly soluble phosphates, such as the reaction of orthophosphoric acid with an appropriate oxide or base, for example with calcium or magnesium oxide, or the reaction of a water-soluble salt of ortho-phosphoric acid with an appropriate salt or base, for example, trisodium phosphate with calcium chloride or magnesium sulfate. Phosphates having the desired proportions of three or more equivalents of metal or base for each phosphate group may be obtained by the use of stoichiometric proportions in the double decomposition reactions or by hydrolysis of the secondary or tertiary phosphates.

Depending on the particular conditions employed in the preparation of synthetic phosphates for the practice of the invention, a variety of differently constituted products may be obtained. These include the normal orthophosphates such as tricalcium or trimagnesium phosphates, the hemihydrate, $2Ca_3(PO_5)_2 \cdot H_2O$, which is believed by some to be the salt, $Ca_3H_2P_2O_9$, of the diatomic acid, $H_8P_2O_9$, which contains the equivalent of two phosphate groups per molecule, and other hydrates, as well as such preferred phosphates as the hydroxy apatites, such as hydroxy apatite (calcium hydroxy hexaphosphate)

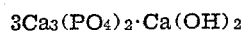

$$3Ca_3(PO_4)_2 \cdot Ca(OH)_2$$

which contains the equivalent of six phosphate groups per molecule, and like phosphates having an apatite lattice. However constituted, the phosphates used in the practice of the invention are derivatives of ortho-phosphoric acid, even though, in a strict sense, they may not be orthophosphates, but may more properly be considered as salts of those phosphoric acids which have at least as much water of constitution as ortho-phosphoric acid, and in which salts at least three equivalents of base are associated in the compounds for each phosphate group. In general, these phosphates are used in amounts of from approximately 0.04% to 5% by weight of the total suspension.

As described and claimed in my before-mentioned application the effectiveness of the phosphate dispersing agents can be modified and increased by use of an "extender." Such extenders comprise anionic surface-active agents.

"Surface-active agents" are organic compounds which, when present in a solution in sufficient concentration, have the property of effecting a change in surface phenomena such as the surface tension of the solution medium. These agents, as is well known in the art, function by virtue of an organophylic group associated with a hydrophylic group. "Anionic surface-active agents" are those surface-active agents in which the organophylic group is contained in an anion. For example, the organophylic group may form part of a carboxylate, sulfonate, or sulfate anion. Thus, "anionic surface-active agents" which have been found useful as "extenders" in the practice of this invention include such diverse compounds as sodium caproate, oleic acid and ortho-carboxybenzene-azo-dimethylaniline. It appears, however, that the more active surface-active agents are the more effective "extenders" according to the invention. Dodecylbenzene sodium sulfonate exhibits particular utility. Organic sulfates and sulfonates, such as long chain alkyl sulfates and sulfonates as obtained by the sulfation or sulfonation of alcohols and hydrocarbons; alkali sulfite-addition products of neutral esters of unsaturated polycarboxylic acids; alkyl aromatic sulfonates such as obtained by the sulfonation of alkylated aromatic hydrocarbons; and aryl alkyl polyether sulfonates such as obtained by the sulfonation of the condensation products of ethylene oxide and alkyl phenols, are also particularly effective.

If difficultly soluble phosphates of sub-micronic particle size are dispersed in water, the particles tend to flocculate or coalesce into relatively large agglomerates. When such phosphates are used as dispersing agents in suspension polymerization, this tendency of the phosphate particles to agglomerate, if uninhibited, causes the formation of large agglomerates during the polymerization. For example, after five hours of polymerization in the presence of difficultly soluble phosphates originally of sub-micronic particle size, phosphate agglomerates having diameters as large as 160 microns were observed. It was found, however, that by the use of anionic surface-active agents in amounts described later, the agglomerations of the phosphate particles can be controlled.

While no attempt is made to explain the phenomena by which the anionic surface-active agent, or "extender" operates, it is believed that its ability to control flocculation of the phosphate particles is directly connected with its utility in "extending" the dispersing properties of the phosphates in accordance with the invention. Moreover, these phosphate dispersing agents are "extended" by specific effective ranges of concentrations of the anionic surface-active agents. In concentrations below or above these ranges, the anionic surface-active agents are not effective for this purpose and in too high concentrations may have an adverse effect. In fact, concentrations of surface-active agents higher than these ranges permit the formation of agglomerates even larger than the 160 micron agglomerates mentioned above. The use of the term "extended phosphate dispersing agent" is intended to mean, therefore, a phosphate dispersing agent used in association with the proper concentration of anionic surface-active agent for "extending" or expanding its utility or function as a dispersing agent. These limits and ranges of concentrations will be discussed and illustrated hereinafter.

The term "extending concentrations," includes those concentrations of anionic surface-active agent which, in the presence of an employed phosphate dispersing agent, do not materially affect the surface tension of the aqueous phase. The lower limits on "extending concentrations" are those concentrations below which the anionic surface-active agent has no apparent effect on the phosphate dispersing agents according to the invention. The reference to surface tension applies to surface tension of the aqueous phase during the polymerization. For example, with highly active surface-active materials there may be a temporary, initial lowering of the surface tension by about 5-10 dynes per centimeter, as measured by a Du Nouy tensiometer. This initial lowering is not consequential, however, since the surface tension resumes its original value after the polymerization has proceeded for some time. A wide variety of anionic surface-active agents may be used to extend the buffered phosphate dispersing agent according to the invention. For example, suitable surface-active agents are dodoecylbenzene sodium sulfonate (Nacconol), sodium tetradecyl sulfate (Tergitol 04), sodium pentadecyl sulfate (Tergitol 07), sodium octyl sulfate (Tergitol 08), sodium sulfate of aryl alkyl polyether sulfonate (Triton 720), oleic acid, crude sodium oleate (saponified red oil), sodium laurate, sodium caproate, sodium caprylate, potassium stearate, calcium oleate (precipitated in situ from sodium oleate and $CaCl_2$), calcadur-red 8BL-diazo dye (sodium salt of 3,3'-disulfodiphenylurea - 4,4' - diazo-bis-amino-8-naphthol-6-sulfonic acid), azosol-fast orange 3RA-monoazo dye (ortho-carboxybenzene-azo-dimethylaniline), brilliant carmine L (sodium salt of 2,5,2',5'-tetramethyl-triphenylmethane-4,4'-diazo - bis - beta-naphthol-disulfonic acid). In general, these extenders, when utilized, are present in from about 0.0005 to 0.006% by weight based on the total suspension weight.

The processes of the invention are applicable to suspension polymerization of any polymerizable ethylenic monomer. By the term "polymerizable ethylenic monomer," it is intended to include any ethylenic compound which is polymerizable under the conditions of suspension polymerization, that is with or without catalysts, such as the peroxide type, for example benzoyl peroxide, possibly under the influence of heat, and at subatmospheric, atmospheric or superatmospheric pressures. Combinations of two or more polymerizable monomers are also included, as well as those ethylenic compounds which will not polymerize by themselves but will do so in conjunction with other monomers.

More particularly, the invention is applicable to the polymerization of vinyl aryl monomers, such as styrene, ortho- or para-monochlorostyrenes, dichlorostyrenes and vinyl naphthalenes. By the processes of the invention it is possible to polymerize aromatic vinyl monomers to clear beads or pearls in concentrations of aqueous suspensions and to molecular weights higher than heretofore possible with a water-insoluble phosphate as the dispersing agent. The invention has been observed to have particular utility in the polymerization of styrene. However, in place of styrene there may be used various polymerizable ethylenic monomers and combinations thereof as will appear more fully in the examples below.

In general, the application of the processes of the invention is illustrated by preparing an aqueous suspension of a phosphate dispersing agent, preferably with an extender, and a buffer, adding the catalyzed polymerizable monomer composition, maintaining said suspension with stirring at or below approximately 90° C. until substantial polymerization has been effected and then raising the temperature of the suspension above 100° C. and preferably to approximately 110° to 115° C. to effect more complete polymerization.

It is to be realized that in those instances in which an extender has been used the buffer need not be included in the original phosphate suspension, but can be added to the polymerization suspension after substantial polymerization has been effected and before the temperature is raised to effect more complete polymerization.

As will be illustrated in the examples, benzoyl peroxide is the preferred catalyst. However, in place of benzoyl peroxide there may be substituted other polymerization catalysts. Preferably, the catalysts should be soluble in styrene or in whatever polymerizable ethylenic monomer, or mixture thereof, is used. Thus, in place of benzoyl peroxide there may be used acetyl peroxide, tertiary-butyl hydroperoxide, ditertiary-butyl peroxide, lauryl peroxide, phthalyl peroxide, tetrahydrophthalyl peroxide, succinyl peroxide, etc. and combinations of these.

The invention is illustrated by, but not restricted to, the following preferred embodiments. As used below a "normal" run indicates a product of clear polymer beads.

EXAMPLE I

Aqueous suspensions containing 0.5% commercial magnesium phosphate, 0.003% Nacconol NR (dodecylbenzene sodium sulfonate) and varying quantities of commercial magnesium oxide were prepared using water in an amount of 40% of the total polymerization suspension (30 gallons). There was added styrene in an amount equivalent to 60% by weight of the total charge, said styrene containing 0.2% (based on styrene) of benzoyl peroxide. These mixtures were agitated and heated for the times shown in Table I, with the indicated results, illustrating the use of varying amounts of magnesium oxide as a buffer. All suspensions were stable at 90° C.

*Table I*

[Total charge—30 gallons.]

| Run No. | 1 | 2 | 3 | 4 | 5 |
|---|---|---|---|---|---|
| Styrene/water ratio | 60/40 | 30/70 | 60/40 | 60/40 | 60/40. |
| Percent MgO on $Mg_3(PO_4)_2$ | 0 | 0 | 2.8 | 4.7 | 9.3. |
| Hours heated at: | | | | | |
| 90° | 6 | 6 | 6 | 6 | 6. |
| 100° | 3 | 8 | 8 | 12 | 13. |
| Result | Agglomerated | Agglomerated | Normal | Normal | Normal. |

Additional charge given in percent:
$Mg_3(PO_4)_2$ ---------------------------------------------------------------- 0.50.
Nacconol NR ---------------------------------------------------------------- 0.003.
Benzoyl peroxide ---------------------------------------------------------------- 0.2 (based on styrene).
MgO ---------------------------------------------------------------- 0–9.3 (on $Mg_3(PO_4)_2$).

EXAMPLE II

Aqueous suspensions of 0.1% synthetic magnesium phosphate are prepared by the general procedure of dissolving trisodium phosphate hydrate in a given volume of water (40% by weight of the system) at approximately 50° C. and adding thereto while stirring solid magnesium sulfate. The pH of the system is adjusted as indicated in Table II and there are added varying amounts of magnesium oxide. Sixty per cent styrene containing 0.175% benzoyl peroxide is added to the aqueous suspension and polymerization carried out with agitation at approximately 90° C. for 6–7 hours and at 100° C. for 4 hours. The results are indicated in Table II.

*Table II*

| Run No. | 1 | 2 | 3 | 4 | 5 | 6 | 7 |
|---|---|---|---|---|---|---|---|
| Percent MgO on $Mg_3(PO_4)_2$ | 0 | 2.5 | 5.0 | 2.5 | 5.0 | 2.5 | 5.0. |
| Initial pH | 7.8 | 7.8 | 7.8 | 9.0 | 9.0 | 10.5 | 10.5. |
| Result | Agg | Normal | Normal | Normal | Normal | Ppt | Ppt. |

Charge given in percent:
Styrene ---------------------------------------------------------------- 60.
Water ---------------------------------------------------------------- 40.
Nacconol NRSF ---------------------------------------------------------------- 0.005.
Benzoyl peroxide ---------------------------------------------------------------- 0.017 (on styrene).
MgO ---------------------------------------------------------------- Varied.
Agg.=agglomerated.
Ppt.=precipitated.

EXAMPLE III

Example I is repeated utilizing a monomer/water ratio of 7:3. Substantially similar results are obtained.

EXAMPLE IV

Example II is repeated utilizing a monomer/water ratio of 7:3. Substantially similar results are obtained.

EXAMPLE V

Aqueous suspensions containing 0.75% trimagnesium phosphate in an amount of water equal to 40% by weight of the total charge, 800 g., and containing 0.003% Nacconol NR (dodecylbenzene sodium sulfonate) are prepared and there are added various buffers in the amounts indicated in Table III. To an aqueous suspension is added styrene in an amount equal to 60% by weight of the polymerization suspension, said styrene containing 0.2% benzoyl peroxide (based on styrene). The polymerization suspension is agitated and heated at 90° C. for 6 hours and 4 hours at 110° C. The results are indicated in Table III.

*Table III*

| Run No. | Buffer | Percent (Based on Phosphate) | Results |
|---|---|---|---|
| 1 | CaO | 2.7 | Very fine beads. |
| 2 | CaO | 6.7 | Do. |
| 3 | CaO | 10.0 | Do. |
| 4 | BaO | 2.7 | Do. |
| 5 | BaO | 6.7 | Fine to 1/32" beads. |
| 6 | BaO | 10.0 | Fine to 1/8" beads. |
| 7 | MgO | 2.7 | Very fine beads. |
| 8 | MgO | 6.7 | Fine beads. |
| 9 | MgO | 10.0 | Do. |
| 10 | MgO | 2.7 | Fine to 1/32" beads. |
| 11 | MgO | 6.7 | Fine beads. |
| 12 | MgO | 10.0 | Do. |
| 13 | ZnO | 2.7 | Very fine beads. |

EXAMPLE VI

Trimagnesium phosphate, 0.5% based on 188 g. total charge, was suspended in an amount of water equivalent to 40% by volume of the total polymerization suspension. To this was added 2.5% magnesium oxide (based on magnesium phosphate). Styrene in an amount of 60% by volume containing 0.2% (based on styrene) of benzoyl peroxide was added. The container was sealed and the suspension agitated and heated for 6½ hours at 90° C. and for 3½ hours at 115° C. to effect polymerization. There were obtained fine polystyrene beads.

EXAMPLE VII

Example VI was repeated except that there was used 0.5% magnesium oxide. There were obtained 1/16" to 1/8" polystyrene beads.

EXAMPLE VIII

Aqueous suspensions of 0.04% and 0.1% of a calcium phosphate were prepared by slurrying 112% calcium hydroxide in approximately 360 ml. water and gradually adding with stirring ortho-phosphoric acid equivalent to the calcium phosphate. Then the phosphate slurry was digested at 90° C. until a constant pH was observed. The water contained varying quantities of extender, Nacconol NRSF (dodecylbenzene sodium sulfonate) as indicated in the table below. Styrene (440 g.) containing 0.2% benzoyl peroxide was added and the polymerization vessel sealed. The mixture was heated with agitation for 6½ hours at 90° C. and for 3½–5 hours at 115° C. The results are indicated in Table IV.

*Table IV*

| Run No. | Percent Calcium Phosphate | Percent Extender ×1,000 | Result |
|---|---|---|---|
| 1 | 0.04 | 0.5 | Normal. |
| 2 | 0.04 | 2.0 | Do. |
| 3 | 0.04 | 3.0 | Do. |
| 4 | 0.04 | 4.0 | Precipitated. |
| 5 | 0.1 | 0.25 | Normal. |
| 6 | 0.1 | 0.5 | Do. |
| 7 | 0.1 | 0.75 | Do. |
| 8 | 0.1 | 1.0 | Do. |
| 9 | 0.1 | 2.0 | Do. |
| 10 | 0.1 | 3.0 | Do. |
| 11 | 0.1 | 4.0 | Do. |
| 12 | 0.1 | 5.0 | Do. |
| 13 | 0.1 | 6.0 | Do. |
| 14 | 0.1 | 7.0 | Precipitated. |

EXAMPLE IX

An aqueous suspension containing 0.5% synthetic trimagnesium phosphate in an amount of water equal to 40% by weight of the total charge (800 g.) and containing 0.003% Nacconol NRSF (dodecylbenzene sodium sulfonate) and 2.5% magnesium oxide (based on phosphate) is prepared. To this is added 60% by weight styrene containing 0.2% benzoyl peroxide (based on styrene). The polymerization suspension is agitated and heated at 90° C. for 6 hours and at 110° C. for 4 hours. Clear polymer beads are obtained.

While the invention and the advantages thereof have been illustrated with particular reference to styrene as the polymerizable ethylenic monomer, particular magnesium and calcium phosphates as the dispersing agent, and dodecylbenzene sodium sulfonate as the extender, it will be understood that other like materials may be used in their places in conjunction with the buffers of this invention. Thus, in place of difficultly soluble phosphates of calcium and magnesium, the difficultly soluble phosphates of other metals such as aluminum, barium, strontium, zinc, and cadmium may be used to give clear beads according to the processes set forth above. Also, in place of dodecylbenzene sodium sulfonate there may be substituted the surface-active agents noted above, as well as many others of the anionic type, especially the highly active surface-active agents such as the organic sulfonates, sulfates and carboxylates, each organic residue of which contains one or more alkyl groups totaling up to about 18 carbon atoms, and preferably containing more than 6 carbon atoms.

Also, in place of styrene there may be used various polymerizable ethylenic monomers including ortho-chlorostyrene; para-chlorostyrene; 2,6-dichlorostyrene; 2,4-dichlorostyrene; 2,5-dichlorostyrene; 2,3-dichlorostyrene; 3,4-dichlorostyrene; the higher polychlorostyrenes; para-methylstyrene; ortho-methylstyrene; meta-methylstyrene; ethyl vinyl benzenes; 4-vinyl pyridine; vinyl naphthalene; the mixtures of these with each other or with styrene; or other copolymerizing material such as acrylonitrile; fumaronitrile; maleimide; methyl-methacrylate; butyl acrylate; divinylbenzene; isopropenylbenzene; polychloro ring-substituted isopropenylbenzene; para-isopropenyldiphenyl; para-vinyldiphenyl; methacrylonitrile; acrylic acid; butadiene; isoprene; 2,3-dimethylbutadiene; 2,-chlorobutadiene-1,3; vinylidene chloride; etc.

It will be noted that various polymerizable compositions of two or more of the above recited monomers are included within the scope of the invention. Thus, combinations of two, three, four, five, or more monomers can be copolymerized utilizing the present invention. The only limitation is that there be in the polymerizable composition at least one ethylenic monomer polymerizable. Examples of copolymers are styrene and dichlorostyrene, styrene and acrylonitrile, styrene and lauryl methacrylate, styrene and acrylic acid, styrene and vinylidene chloride, styrene and butylacrylate, divinylbenzene and dichlorostyrene, vinylchloride and acrylonitrile, divinylbenzene and styrene, and vinylchloride and vinylidene chloride.

Polymers of three monomers are, for example, styrene, acrylonitrile and divinylbenzene; styrene, 4-vinylpyridine and 2,6-dichlorostyrene; styrene, acrylonitrile and 4-vinylpyridine; 2,6-dichlorostyrene, isopropenylbenzene and methyl methacrylate; and divinylbenzene, 2,4-dichlorostyrene and 4-vinylpyridine.

Other copolymers are tetrapolymers obtained by the polymerization of, for example, styrene, acrylonitrile, divinylbenzene and 4-vinylpyridine, dichlorostyrenes, isopropenylbenzene, methyl methacrylate and styrene, and styrene, acrylic acid, methacrylontrile and para-vinyldiphenyl.

Examples of copolymers derived from mixtures of a higher number of monomers are the polymerization products of such mixtures as styrene, p-chlorostyrene, 2,6-dichlorostyrene, acrylonitrile, p-methylstyrene, vinylnaphthalene, and butyl acrylate and styrene, divinylbenzene, 4-vinylpyridine, vinylidene chloride, acrylonitrile, methyl methacrylate, and isopropenylbenzene. Still other examples are the polymerization products of such mixtures as (1) styrene, ortho-chlorostyrene, 3,4-dichlorostyrene, para-methylstyrene, 4-vinyl pyridine, butyl acrylate, divinylbenzene, acrylic acid, and isoprene, (2) styrene, ortho-chlorostyrene, 3,4-dichlorostyrene, acrylonitrile, methyl methacrylate, divinylbenzene, para-isopropenyldiphenyl, and para-vinyldiphenyl, (3) styrene, ortho-chlorostyrene, 3,4-dichlorostyrene, acrylonitrile, methyl methacrylate, divinylbenzene, para-isopropenyldiphenyl, para-vinyldiphenyl, methacrylonitrile, vinylidene chloride, acrylic acid, and isoprene, and (4) styrene, ortho-chlorostyrene, 3,4-dichlorstyrene, acrylonitrile, methyl methacrylate, divinylbenzene, para-isopropenyldiphenyl, para-vinyldiphenyl, maleimide, butyl acrylate, methacrylonitrile, and 2-chlorobutadiene-1,3.

EXAMPLE X

Following the procedure outlined in Example IX and utilizing the quantities there employed except substituting for the styrene there used an equal weight of mixed dichlorostyrenes, there are obtained clear polymer beads.

EXAMPLE XI

Following the procedure outlined in Example IX and utilizing the quantities there employed except substituting for the styrene there used an equal weight of 4-vinyl pyridine, there are obtained clear polymer beads.

EXAMPLE XII

Following the procedure outlined in Example IX and utilizing the quantities there employed except substituting for the styrene there used an equal weight of methyl methacrylate, there are obtained clear polymer beads.

EXAMPLE XIII

Following the procedure outlined in Example IX and utilizing the quantities there employed except substituting for the styrene there used an equal weight of vinyl naphthalene, there are obtained clear polymer beads.

EXAMPLE XIV

Following the procedure outlined in Example IX and utilizing the quantities there employed except substituting for the styrene there used an equal weight of ortho-monochlorostyrene, there are obtained clear polymer beads.

EXAMPLE XV

Following the procedure outlined in Example IX and utilizing the quantities there employed except substituting for the styrene there used an equal weight of a mixture of 54 parts styrene and 6 parts acrylonitrile, there are obtained clear polymer beads.

EXAMPLE XVI

Following the procedure outlined in Example IX and utilizing the quantities there employed except substituting for the styrene there used an equal weight of a mixture of 57 parts styrene and 3 parts lauryl methacrylate, there are obtained clear polymer beads.

EXAMPLE XVII

Following the procedure outlined in Example IX and utilizing the quantities there employed except substituting for the styrene there used an equal weight of a mixture of 39 parts styrene and 21 parts dichlorostyrene (mixed isomers), there are obtained clear polymer beads.

EXAMPLE XVIII

Following the procedure outlined in Example IX and utilizing the quantities there employed except substituting for the styrene there used an equal weight of a mixture of 54 parts styrene and 6 parts acrylic acid, there are obtained fine yellow polymer beads.

EXAMPLE XIX

Following the procedure outlined in Example IX and utilizing the quantities there employed except substituting for the styrene there used an equal weight of a mixture of 25 parts styrene and 25 parts vinylidene chloride, there are obtained clear polymer beads.

EXAMPLE XX

Following the procedure outlined in Example IX and utilizing the quantities there employed except substituting for the styrene there used an equal weight of a mixture of 54 parts styrene and 6 parts butyl acrylate, there are obtained clear polymer beads.

EXAMPLE XXI

Following the procedure outlined in Example IX and utilizing the quantities there employed except substituting for the styrene there used an equal weight of a dehydrogenated diethylbenzene mixture containing 30 per cent divinylbenzene and 70 per cent other products of the dehydrogenation, there are obtained clear polymer beads.

While the invention has been described with reference to particular embodiments thereof, it will be understood that in its broader aspects the invention is not limited thereto, but the invention may be variously embodied within the scope of the invention as set forth herein and in the appended claims.

I claim:

1. In a process for preparing polymer beads comprising polymerizing a polymerizable composition comprising at least one ethylenic monomer while said polymerizable composition is suspended in water, said water suspension being stabilized during the polymerization by means of a finely divided phosphate diffcultly soluble in water and containing at least three equivalents of a metal the carbonate of which is only slightly soluble in water said polymerization being catalyzed by a peroxide catalyst, the improvement comprising maintaining the pH of said suspension between approximately 6 and 9 by the addition of a buffer chosen from the class consisting of the oxides and hydroxides of a metal chosen from the class consisting of magnesium, calcium, barium, and zinc, in which suspension the ratio in parts by weight of said polymerizable composition to water is no more than 3:1.

2. The process of claim 1, in which the polymerizable composition comprises styrene, the phosphate is calcium phosphate and the buffer is calcium hydroxide.

3. The process of claim 1, in which the phosphate has a particle size predominantly of a size in the range 0.2–0.005 micron.

4. The process of claim 1, in which the phosphate is calcium phosphate having a particle size predominantly of a size in the range 0.2–0.005 micron and in which the polymerizable composition comprises styrene.

5. The process of claim 1, in which the phosphate is a magnesium phosphate and the buffer is magnesium oxide and in which the polymerizable composition comprises styrene.

6. The process of claim 1, in which the phosphate is a magnesium phosphate having a particle size predominantly of a size in the range 0.2–0.005 micron and the buffer is magnesium oxide, and in which the polymerizable composition comprises styrene.

7. In a process for preparing polymer beads comprising polymerizing a polymerizable composition comprising at least one ethylenic monomer while said polymerizable composition is suspended in water, said water suspension being stabilized during the polymerization by means of an anionic surface-active agent and of a finely divided phosphate difficultly soluble in water and containing at least three equivalents of a metal the carbonate of which is only slightly soluble in water said polymerization being catalyzed by a peroxide catalyst, the improvement comprising maintaining the pH of said suspension between approximately 6 and 9 by the addition of a buffer chosen from the class consisting of the oxides and hydroxides of a metal chosen from the class consisting of magnesium, calcium, barium, and zinc, in which suspension the ratio in parts by weight of said polymerizable composition to water is no more than 3:1.

8. The process of claim 7 in which the phosphate is predominantly of the size in the range 0.2–0.005 micron.

9. The process of claim 8 in which the polymerizable composition comprises styrene, the phosphate is calcium phosphate and the buffer is calcium hydroxide.

10. The process of claim 8 in which the phosphate is magnesium phosphate, the buffer is magnesium oxide and in which the polymerizable composition comprises styrene.

11. The process of claim 7 in which the polymerizable composition comprises styrene, the phosphate is calcium phosphate and the buffer is calcium hydroxide.

12. The process of claim 7 in which the phosphate is magnesium phosphate, the buffer is magnesium oxide and in which the polymerizable composition comprises styrene.

References Cited in the file of this patent

UNITED STATES PATENTS

| Number | Name | Date |
| --- | --- | --- |
| 1,966,513 | Moss | July 17, 1934 |
| 2,404,791 | Coffman | July 30, 1946 |
| 2,524,627 | Hohenstein | Oct. 3, 1950 |
| 2,570,532 | Eisenberg | Oct. 9, 1951 |